United States Patent
Shiota et al.

(10) Patent No.: US 9,866,713 B2
(45) Date of Patent: Jan. 9, 2018

(54) READING DEVICE WITH MAIN BODY AND COVER

(71) Applicant: SEIKO EPSON CORPORATION, Tokyo (JP)

(72) Inventors: Yuzo Shiota, Nagano (JP); Haruyuki Imai, Nagano (JP); Kuniaki Ueki, Nagano (JP); Satoshi Shimizu, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/230,729

(22) Filed: Aug. 8, 2016

(65) Prior Publication Data

US 2017/0070629 A1   Mar. 9, 2017

(30) Foreign Application Priority Data

Sep. 8, 2015   (JP) .................................. 2015-176759

(51) Int. Cl.
  *H04N 1/00*   (2006.01)

(52) U.S. Cl.
  CPC ..... *H04N 1/00891* (2013.01); *H04N 1/00551* (2013.01); *H04N 1/00814* (2013.01); *H04N 1/00904* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2003/0231288 A1* | 12/2003 | Sugeta | .................... | G03B 27/52 355/40 |
| 2005/0052712 A1* | 3/2005 | Chen | .................... | H04N 1/2032 358/498 |
| 2005/0094218 A1* | 5/2005 | Ando | ...................... | F16F 15/04 358/474 |
| 2011/0176160 A1* | 7/2011 | Manabe | ............. | G06K 15/4055 358/1.14 |
| 2012/0147439 A1* | 6/2012 | Taki | .................... | H04N 1/00925 358/448 |
| 2012/0182568 A1* | 7/2012 | Isogai | ................ | G03G 15/5004 358/1.13 |
| 2012/0188617 A1* | 7/2012 | Klausbruckner | .... | H04N 1/0057 358/498 |
| 2013/0163056 A1* | 6/2013 | Hanayama | ......... | H04N 1/00013 358/474 |
| 2013/0215481 A1* | 8/2013 | Hayasaka | ............ | G03G 15/607 358/498 |
| 2014/0009052 A1* | 1/2014 | Ohama | .................... | B41J 29/13 312/326 |

(Continued)

FOREIGN PATENT DOCUMENTS

JP   2014-194485 A   10/2014

*Primary Examiner* — Ming Hon
(74) *Attorney, Agent, or Firm* — Global IP Counselors, LLP

(57) ABSTRACT

A reading device includes a first housing, and a second housing capable of being attached and detached in relation to the first housing, in which the first housing includes a reading unit which reads a document according to a reading mode, and a power transmission circuit which wirelessly supplies power to the second housing according to the reading mode, and in which the second housing includes a power reception circuit which wirelessly receives power from the power transmission circuit.

19 Claims, 10 Drawing Sheets

(56) References Cited

U.S. PATENT DOCUMENTS

| | | | | |
|---|---|---|---|---|
| 2014/0168680 A1* | 6/2014 | Shiomi | ............... | H04N 1/00907 358/1.13 |
| 2014/0198338 A1* | 7/2014 | Onishi | ............... | H04N 1/00901 358/1.14 |
| 2014/0293378 A1* | 10/2014 | Kakuta | ............... | H04N 1/00559 358/498 |
| 2014/0355052 A1* | 12/2014 | Mikashima | ........ | H04N 1/00904 358/1.15 |
| 2015/0229798 A1* | 8/2015 | Otsuka | ............... | H04N 1/00904 358/468 |

* cited by examiner

READING DEVICE WITH MAIN BODY AND COVER

CROSS REFERENCES TO RELATED APPLICATIONS

The entire disclosure of Japanese Patent Application No. 2015-176759, filed Sep. 8, 2015 is incorporated by reference herein.

BACKGROUND

1. Technical Field

The present invention relates to a reading device.

2. Related Art

There is known a flatbed scanner which is provided with an automatic feeding device (Auto Document Feeder (ADF)) capable of automatically transporting a plurality of documents which are placed on a document tray. The documents which are transported by the ADF sequentially become a reading target. The document tray and the ADF are installed on a cover (a cover for closing a document stand) which is disposed on a main body of the scanner which includes the document stand which is formed of a transparent glass or plastic. The main body and the cover of the scanner are connected by a cable for supplying power from the main body to a cover-side drive unit (the ADF or the like) (for example, refer to JP-A-2014-194485).

The presence of the above-described cable increases the difficulty and the complexity of assembly work of a product. The presence of the cable may be an impeding factor in relation to size reduction, weight reduction, cost reduction, and the like of the product.

SUMMARY

An advantage of some aspects of the invention is to provide a reading device which solves various problems caused by the presence of a cable such as the one described above.

According to an aspect of the invention, a reading device includes a housing, and a cover capable of being attached and detached in relation to the housing, in which the housing includes a reading unit which reads a document according to a reading mode, and a power transmission circuit which wirelessly supplies power to the cover according to the reading mode, and in which the cover includes a power reception circuit which wirelessly receives power from the power transmission circuit.

According to this configuration, the supply of power from the housing (the main body side) of the reading device to the cover side is executed by wireless between the power transmission circuit and the power reception circuit. In other words, the contactless power supply is performed. Accordingly, the cable for connecting the housing (the main body side) to the cover side becomes unnecessary. By performing favorable reading according to the reading mode and supply of only the power which is necessary for the reading, it is possible to suppress wasteful supplying of power.

In the reading device, the housing may include a window, the cover may include a transport mechanism which transports a document to a position facing a first region of the window using power from the power reception circuit in a state of being mounted on the housing, the reading device may be provided with reading modes including a first reading mode which causes the reading unit to read the document which is transported by the transport mechanism through the first region, and a second reading mode which causes the reading unit to read the document which is not transported by the transport mechanism through the second region of the window, in the first reading mode, the reading unit may perform reading using the first region and the power transmission circuit performs power transmission, and in the second reading mode, the reading unit may perform reading using the second region and the power transmission circuit does not perform power transmission.

In the reading device, the housing may include the power transmission circuit in a position outside of the window of the second region of an opposite side from a side of the first region, and the cover may include the power reception circuit in a position facing the power transmission circuit in a state in which the cover is mounted to the housing.

According to this configuration, the power transmission circuit is positioned outside of the window on the opposite side of the second region from the side of the first region. Therefore, the influence of noise which is generated during the contactless power supply on the reading process by the reading unit which is often stationary corresponding to the first region is suppressed.

In the reading device, a carriage on which the reading unit is installed and which is capable of moving along a predetermined direction under control of the control unit may be included on an inner portion of the housing, and the cover may include handles on both end portions positioned on a one end side and another end side in the predetermined direction in a state in which the window is covered.

According to this configuration, the opening and closing of the cover in relation to the housing and the removal of the cover from the housing become easy.

In the reading device, the housing may include a housing-side wireless communication circuit which executes wireless communication in a position outside of the window of the second region on the side of the first region, and the cover may include a cover-side wireless communication circuit which executes wireless communication in a position facing the housing-side wireless communication circuit in a state in which the window is covered.

According to this configuration, in addition to the supply of power from the housing of the reading device to the cover side, it is also possible to render the communication between the housing and the cover wireless. Since the circuits for contactless power supply (the power transmission circuit and the power reception circuit) and the circuits for wireless communication (the housing-side wireless communication circuit and the cover-side wireless communication circuit) are separated to interpose at least the second region, the influence of the noise which is generated during the contactless power supply on the wireless communication is suppressed.

In the reading device, the power transmission circuit may be positioned on a side of a corner of the second region in a diagonally opposing relationship with a corner of the second region in a vicinity of a position of the housing-side wireless communication circuit.

According to this configuration, the circuits for contactless power supply (the power transmission circuit and the power reception circuit) and the circuits for wireless communication (the housing-side wireless communication circuit and the cover-side wireless communication circuit) can be said to be separated as much as possible, and the influence of the noise which is generated during the contactless power supply on the wireless communication is suppressed.

In the reading device, the housing and the cover may be capable of rotating around a shaft which is interposed between the housing and the cover, and the power transmission circuit may be in a position closer to the shaft than the housing-side wireless communication circuit.

According to this configuration, in the process of closing the cover, contactless power supply becomes possible at an earlier timing (an earlier timing than when wireless communication becomes possible).

In the reading device, the cover may include a leg which protrudes to the housing side in a state in which the window is covered.

According to this configuration, it is possible to prevent the bottom surface of the cover from touching the floor when the cover is removed and placed on the floor.

The technical idea of the invention is also realized by concepts other than the reading device. For example, a method including the process of contactless power supply by the circuits for contactless power supply (the power transmission circuit and the power reception circuit) with which the reading device is provided may be understood as the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, description will be given of embodiments of the invention with reference to the drawings. The drawings are merely examples for explaining the embodiments, and some portions may be exaggerated, inconsistent with each other, or the like.

In the invention, the term "reading device" indicates a device including at least a function (a reading function) of generating image data as a reading result obtained by optically reading a document. Therefore, other than a standalone scanner, the reading device may be a so-called multifunction device with a printer and other functions (for example, a facsimile).

1. Explanation of Structural Characteristics of Reading Device

Figure 1:
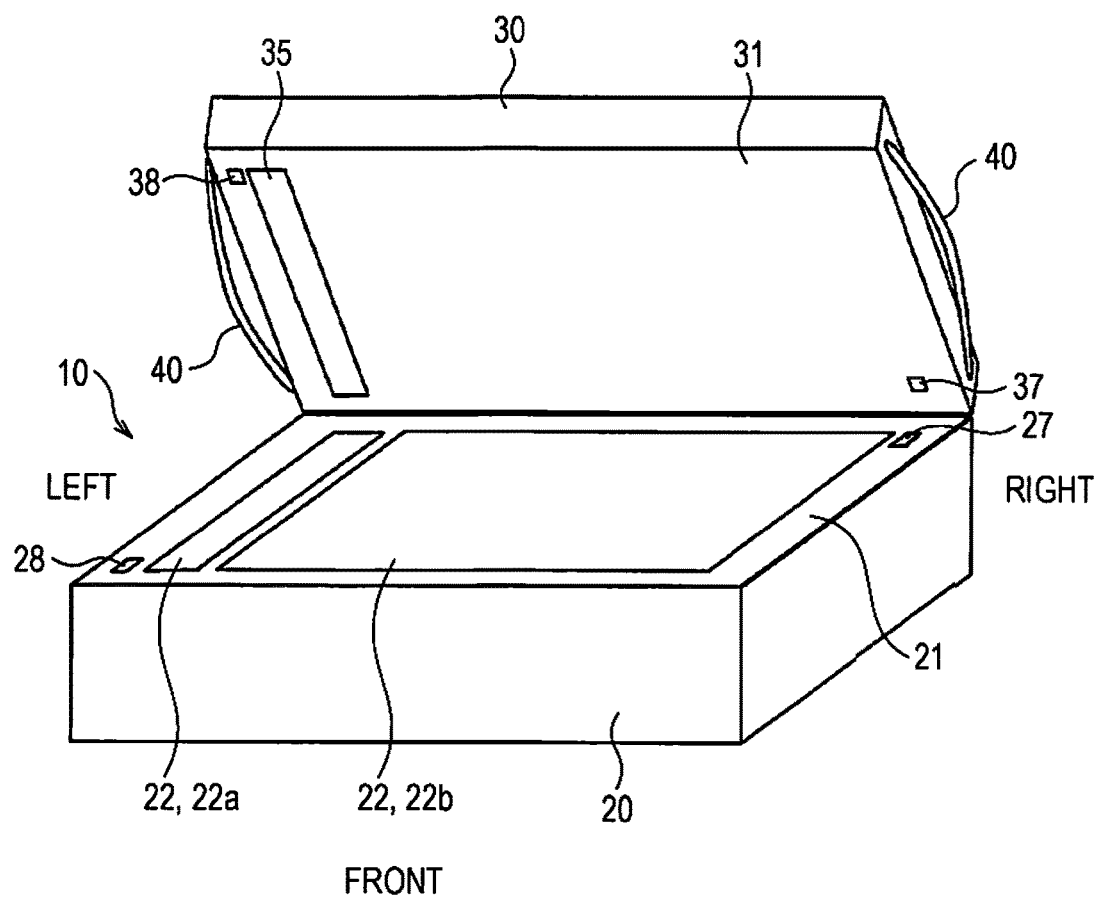
FIG. 1 is a perspective diagram exemplifying the external appearance of a reading device.
Figure 2:
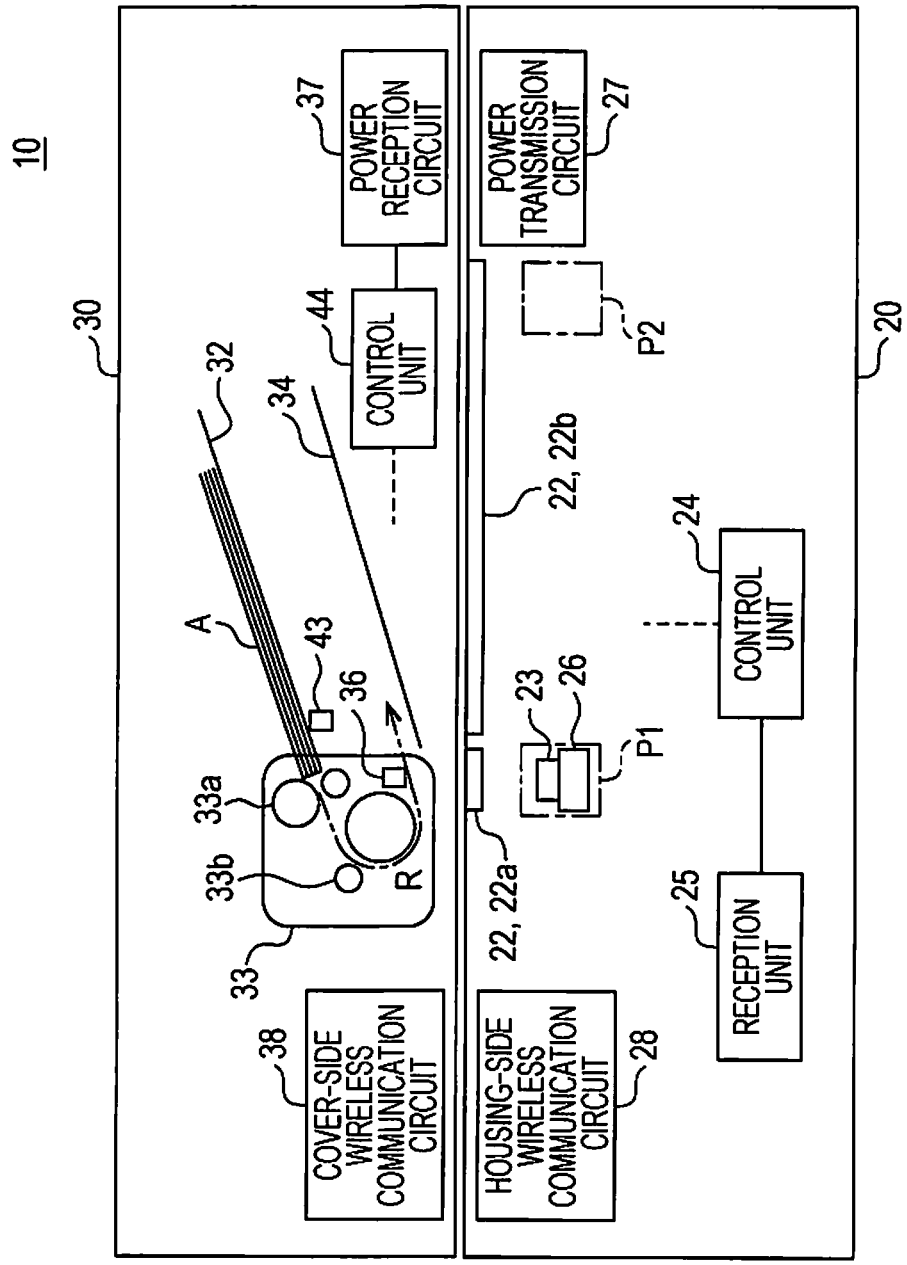
FIG. 2 is a diagram simply exemplifying mainly the internal configuration of the reading device.

FIG. 1 exemplifies the external appearance of a reading device 10 which is a flatbed scanner using a perspective diagram. FIG. 2 simply exemplifies mainly the internal configuration of the reading device 10.

It is mainly possible to ascertain the external appearance of the reading device 10 from a housing 20 and a cover 30. The housing 20 is a first housing which serves as a reading device main body, and the cover 30 is a second housing which is provided on the housing 20.

As exemplified in FIG. 1, one or more windows 22 are provided in a top surface 21 of the housing 20. The windows 22 are formed using plates made of transparent glass or plastic which are fitted into substantially rectangular openings formed by boring into the top surface 21. At least a portion of the windows 22 corresponds to the document stand in the flatbed scanner. In the present embodiment, the regions contained in the windows 22 are referred to as a first region 22a and a second region 22b. The second region 22b is an area corresponding to the document stand and is wider than the first region 22a.

In the example of FIG. 1, the window 22 corresponding to the first region 22a and the window 22 corresponding to the second region 22b are present discretely. The first region 22a is present at a one end side (for example, the left side) in a horizontal direction when facing the reading device 10 from the front side of the reading device 10 (hereinafter, the horizontal direction), and the second region 22b is present at another end side (for example, the right side) in the horizontal direction. Naturally, the positional relationship between the first region 22a and the second region 22b in the horizontal direction may be reversed. The windows 22 may be a single window. In other words, a partial region of the window 22 of which only one is formed in the top surface 21 may be referred to as the first region 22a, and the remaining region may be referred to as the second region 22b. Alternatively, at least a portion of the first region 22a and the second region 22b may overlap. For example, it is possible to refer to the entirety of the single window 22 which is formed in the top surface 21 as the second region 22b, and to also refer to a partial region of the window 22 (the second region 22b) as the first region 22a.

The cover 30 opens and closes the top surface 21. In other words, the cover 30 covers the windows 22 using a bottom surface 31 by assuming the closed state. The cover 30 includes a document tray 32, a transport mechanism 33 which transports a document which is placed on the document tray 32 to a position facing the first region 22a of the windows 22, and the like. The transport mechanism 33 functions as an ADF.

A reading unit 23 (a first reading unit) for executing the reading of the document through the window 22 is disposed in the inner portion of the housing 20. The housing 20 includes a control unit 24, a reception unit 25, and the like. The control unit 24 controls the behavior of the parts of the reading device 10 according to a program, and the reception unit 25 receives various instructions from a user, starting with an instruction to start reading the document (hereinafter, a start instruction). The control unit 24 is configured using an IC including a CPU, a ROM, a RAM, and the like, and another storage medium or the like.

The control unit 24 is capable of controlling a first reading mode and a second reading mode. The first reading mode causes the first reading unit 23 to read a document which is transported by the transport mechanism 33 through the first region 22a of the windows 22, and the second reading mode causes the first reading unit 23 to read a document which is not transported by the transport mechanism 33 through the second region 22b of the windows 22. The expression "a document which is not transported by the transport mechanism 33" indicates a document which is placed on the document stand, that is, on the second region 22b. The first reading mode may be referred to as an ADF scan mode, and the second reading mode may be referred to as a flatbed (FB) scan mode.

In the example of FIG. 2, a plurality of documents which are placed on the document tray 32 is indicated using symbol A. The transport mechanism 33 is capable of transporting the plurality of documents which are placed on the document tray 32 continually along a transport path R, one sheet at a time. In FIG. 2, the transport path R is exemplified using a double-dot-dash line arrow. A paper output stand 34 is provided on the downstream side of the transport path R, and the document which is transported along the transport path R is output onto the paper output stand 34. For example, the transport mechanism 33 includes a separation roller 33a, a transport roller 33b, and the like. The separation roller 33a separates the documents from the document tray 32 into one sheet at a time, and the transport roller 33b transports the document which is separated into a single sheet along the transport path R. Although omitted from the drawings, the transport mechanism 33 includes a motor, a gear train, and the like. The motor is for rotating rollers 33a, 33b, and the like, and the gear train is for transmitting the motive force of the motor to the rollers 33a, 33b, and the like.

The first reading unit 23 includes a line sensor which is long in a direction parallel to the top surface 21 and perpendicular to the horizontal direction. It is possible to adopt various known image sensor systems such as CCD and CIS as the line sensor. The first reading unit 23 includes, as appropriate, a light source and an optical system which are necessary for the line sensor to read the document. In the example of FIG. 2, the first reading unit 23 is installed on a carriage 26 which is capable of moving parallel to the top surface 21 and in the horizontal direction. The top surface 21 is generally rectangular as viewed from above, and the horizontal direction mentioned in the present embodiment is a longitudinal direction of the rectangle. Therefore, the carriage 26 can be said to move along the longitudinal direction of the top surface 21. The carriage 26 moves by the motive force of the motor (not illustrated) under the control of the control unit 24. Specifically, as illustrated in FIG. 2, the carriage 26 is capable of moving between beneath the first region 22a (a position P1) and a side which is distant from the position P1 of the left and right ends of the second region 22b (a position P2). FIG. 2 exemplifies a state in which the carriage 26 on which the first reading unit 23 is installed is present in the position P1. In the present specification, expressions such as parallel and perpendicular mean not only the strict definitions of parallel and perpendicular, but also include a degree of error which may arise in the actual product.

The movement of the first reading unit 23 by the carriage 26 conceptually includes a case in which all of the constituent elements of the first reading unit 23 move, and a case in which at least a portion of the constituent elements of the first reading unit 23 move. For example, in a case in which, among the constituent elements of the first reading unit 23, a portion of the light source and the optical system are installed on the carriage 26 and the image sensor or the like is fixed to a predetermined position, the movement of the constituent elements of the first reading unit 23 which are installed on the carriage 26 is considered to be the movement of the first reading unit 23.

In the reading device 10, in the ADF scan mode, the cover 30 is in the closed state, and the carriage 26 is stopped at the position P1. The document on the document tray 32 is transported along the transport path R by the transport mechanism 33, and the document is read by the first reading unit 23 through the first region 22a during the transporting. A window 35 which faces the first region 22a of the windows 22 in the closed state of the cover 30 is formed in the bottom surface 31 of the cover 30. In other words, the document which is transported along the transport path R by the transport mechanism 33 becomes visible on the first reading unit 23 side via the window 35 of the cover 30 side and the window 22 (the first region 22a) of the housing 20 side. The window 35 may be a simple opening, and may have a plate of transparent glass or plastic inserted therein. Meanwhile, in the FB scan mode, the carriage 26 moves from the position P1 side to the position P2 side (alternatively, from the position P2 side to the position P1 side), and the document which is placed on the document stand, that is, on the second region 22b is read through the second region 22b by the first reading unit 23 during the movement of the carriage 26.

The reading device 10 may be a of a device type capable of executing duplex scanning of the document in the ADF scan mode. The reading of the document by the first reading unit 23 through the first region 22a described above is a process of reading a surface (hereinafter, a one surface) of the document which faces downward (the housing 20 side as viewed from the cover 30) when the document is transported by the transport mechanism 33. This process of reading only the one surface using the first reading unit 23 will be referred to as a simplex scan. Meanwhile, a process of reading the one surface and the surface (hereinafter, the other surface) of the opposite side from the one surface will be referred to as a duplex scan. The cover 30 may include a second reading unit 36 for executing reading of the document as means for realizing the duplex scan. The second reading unit 36 is provided in a position facing the window 35 to interpose the transport path R. The second reading unit 36 includes a line scanner which is long in the same direction as the line scanner of the first reading unit 23. In the ADF scan mode, the reading device 10 is capable of realizing the duplex scan by causing the first reading unit 23 to read the one surface of the document which is transported, and, at approximately the same time, causing the second reading unit 36 to read the other surface of the document.

In the present embodiment, the housing 20 includes a power transmission circuit 27, and the cover 30 includes a power reception circuit 37. The power transmission circuit 27 wirelessly supplies power, and the power reception circuit 37 wirelessly receives power at a position facing the power transmission circuit 27 in a state in which the cover 30 covers the windows 22, that is, in the closed state. Specifically, the power transmission circuit 27 is provided in a position outside of the windows 22 of the second region 22b on the opposite side from the side of the first region 22a. The opposite side is not necessarily exactly the opposite side. In the example of FIG. 1, since the first region 22a is disposed closer to the left side than the center of the second region 22b, the power transmission circuit 27 may be disposed closer to the right side than the center of the second region 22b. The power transmission circuit 27 and the power reception circuit 37 are power transmission side and power receiving side circuits for realizing a so-called contactless power supply, and the supplying of power by wireless from the power transmission circuit 27 to the power reception circuit 37 succeeds due to the circuits coming into proximity of each other within a certain distance.

The contactless power supply is also referred to as non-contact power supply or the like. Various standards of the contactless power supply may be considered, such as an electromagnetic induction system, a magnetic resonance system, and a radio wave reception system. In the electromagnetic induction system, an electric current is caused to flow in a coil embedded in the power transmission side to generate magnetic flux and generate an electric current in a coil of the power receiving side. In the magnetic resonance system, resonators of each of the power transmission side and the power receiving side are caused to magnetically resonate to transmit power. In the radio wave reception system, an electromagnetic wave generated by the power transmission side is received by the power receiving side, converted into a direct current electric current, and used as power. The power reception circuit 37 supplies the power which is received from the power transmission circuit 27 to the parts which require power of the cover 30 side including the transport mechanism 33. In other words, the cover 30 is closed, contactless power supply is performed between the power transmission circuit 27 and the power reception circuit 37, and thus, the document reading in the ADF scan mode which requires the transporting of the document by the transport mechanism 33 is realized. It goes without saying that a power source circuit (not illustrated) is installed on the main body side of the reading device 10, that is, inside the housing 20, and it is possible to drive the first reading unit 23, the control unit 24, the reception unit 25, the carriage 26, the power transmission circuit 27, and the like of the main body side due to the power which is supplied by the power source circuit.

According to the present embodiment, the power supply from the housing 20 (the main body side) of the reading device 10 to the cover 30 side is executed by wireless between the power transmission circuit 27 and the power reception circuit 37. Accordingly, a cable which connects the housing 20 (the main body side) to the cover 30 side becomes unnecessary for the power supply. In other words, due to the cable becoming unnecessary, the assembly work of the product is simplified, and effects such as a reduction in size, a reduction in weight, a reduction in cost, and the like of the product arise.

As described above, in the housing 20, the power transmission circuit 27 is positioned outside of the windows 22 of the second region 22b on the opposite side from the side of the first region 22a. The first reading unit 23 (the carriage 26 on which the first reading unit 23 is installed) in the housing 20 is stationary at the position P1 corresponding to the first region 22a during the ADF scan mode. In other words, at least during the ADF scan mode, the first reading unit 23 and the power transmission circuit 27 are in positions to be separated from each other to interpose the second region 22b.

Therefore, it can be said that the influence of noise which is generated during the contactless power supply which is executed between the power transmission circuit 27 and the power reception circuit 37 on the reading process (the reading result) of the document by the first reading unit 23 is suppressed.

In a case in which controlling the constituent elements of the cover 30 side such as the transport mechanism 33 and the second reading unit 36 using the control unit 24 of the housing 20 side is considered, communication between the housing 20 side and the cover 30 side becomes necessary. Although the idea of realizing the communication in a wired manner is not excluded, when considering that the power supply to the cover 30 side is rendered wireless, it can be said to be more favorable to render the communication wireless in the same manner. Therefore, the housing 20 may include a housing-side wireless communication circuit 28 in a position outside of the windows 22 on the first region 22a side of the second region 22b, and the cover 30 may include a cover-side wireless communication circuit 38 in a position facing the housing-side wireless communication circuit 28 in a state in which the cover 30 covers the windows 22, that is, in the closed state. The housing-side wireless communication circuit 28 and the cover-side wireless communication circuit 38 both execute wireless communication. The housing-side wireless communication circuit 28 and the cover-side wireless communication circuit 38 are proximal to each other within a certain distance to execute wireless communication using each other as communication destinations. It is of no particular concern as to which standard of wireless communication adopted by the housing-side wireless communication circuit 28 and the cover-side wireless communication circuit 38, and it is possible to adopt various standards such as near field communication (NFC) and infrared beam communication.

In the example of FIG. 1, since the first region 22a is disposed closer to the left side than the second region 22b, the housing-side wireless communication circuit 28 is also disposed closer to the left side than the second region 22b. In other words, the housing-side wireless communication circuit 28 and the power transmission circuit 27 are present in positions which are separated from each other to interpose at least the second region 22b. Therefore, the influence of noise which is generated during the contactless power supply which is executed between the power transmission circuit 27 and the power reception circuit 37 on the wireless communication which is executed between the housing-side wireless communication circuit 28 and the cover-side wireless communication circuit 38 is suppressed.

In order to ensure that the influence of the noise does not reach the wireless communication, it is desirable for the housing-side wireless communication circuit 28 and the power transmission circuit 27 to be as separated as possible in the vicinity of the top surface 21 of the housing 20. Therefore, the power transmission circuit 27 may be positioned on the side of a corner of the second region 22b which is in a diagonally opposing relationship with a corner of the second region 22b in the vicinity of the position of the housing-side wireless communication circuit 28. Specifically, in the example of FIG. 1, the housing-side wireless communication circuit 28 is in a position which is closer to the left side than the first region 22a and is near to the front side of the reading device 10, and the power transmission circuit 27 is in a position which is closer to the right side than the second region 22b and is near to the rear side of the reading device 10. In this manner, in the present embodiment, the housing-side wireless communication circuit 28 and the power transmission circuit 27 are disposed to be as separated as possible.

The opening and closing of the cover 30 in relation to the housing 20 is performed manually by a user. The cover 30 is configured to be detachable in relation to the housing 20.

Figure 3:
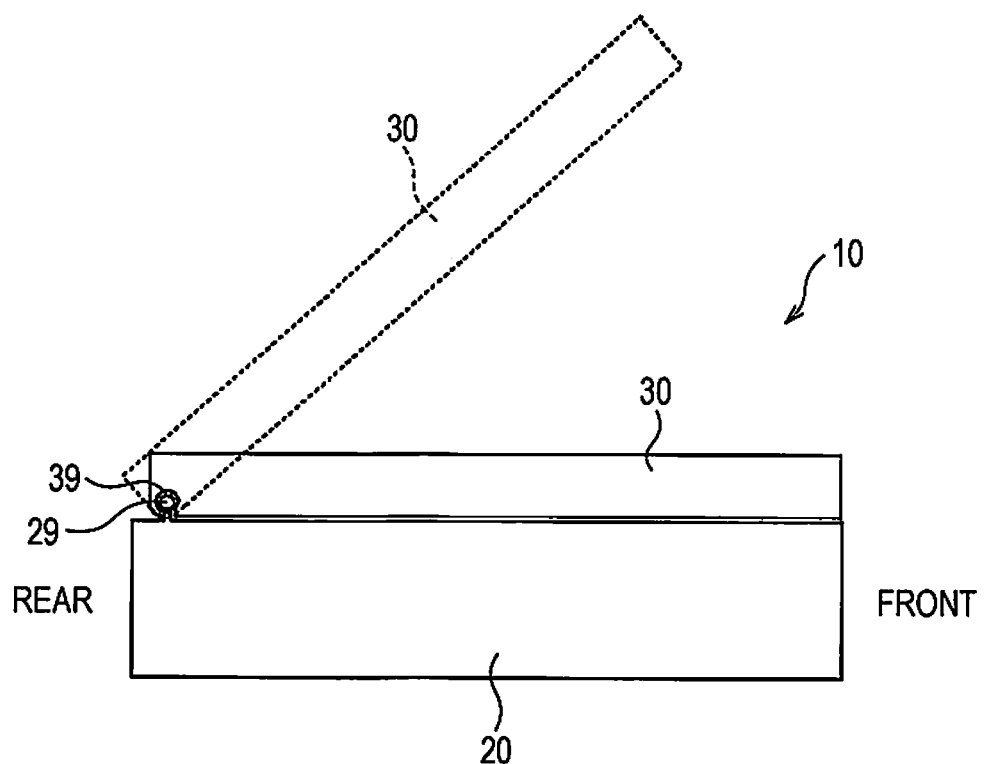
FIG. 3 is a side surface view exemplifying the external appearance of the reading device.

FIG. 3 simply exemplifies the reading device 10 from a perspective from the left side. The housing 20 and the cover 30 are capable of rotating around a shaft 29 which is interposed between the housing 20 and the cover 30. In FIG. 3, the cover 30 in the closed state is depicted using a solid line, and the cover 30 in the open state is depicted using a dotted line. In the example of FIG. 3, the shaft 29 is provided integrally with the housing 20 above the top surface 21 in a position near to the rear side. Meanwhile, the cover 30 includes a recessed portion 39 in a position near to the rear side. The recessed portion 39 has a substantially C-shaped cross section, the inside of which couples with the shaft 29. In other words, the cover 30 is freely opened and closed by the hand of the user in a state in which the recessed portion 39 is coupled with the shaft 29. The user is capable of removing the cover 30 from the housing 20 by removing the recessed portion 39 from the shaft 29, and is capable of mounting the cover 30 onto the housing 20 by coupling the recessed portion 39 with the shaft 29.

Any procedure which couples the shaft 29 and the recessed portion 39 and any procedure which releases the coupling may be adopted as long as the procedures result in the realization of attachment and detachment between the housing 20 and the cover 30. For example, the user slides the cover 30 in the longitudinal direction (the horizontal direction) of the shaft 29 in relation to the housing 20, pulls the cover 30 upward or toward the rear with a strong force, or the like to release the recessed portion 39 from the shaft 29. The user couples the recessed portion 39 with the shaft 29 using the opposite operation from when releasing the recessed portion 39 from the shaft 29. A lock mechanism for prohibiting the removal of the cover 30 may be provided on the housing 20 or the cover 30. In other words, the lock mechanism may have a structure in which the cover 30 may not be removed from the housing 20 unless the user releases the lock mechanism.

The cover 30 includes handles 40 on both end portions which are positioned on the one end side and the other end side in the horizontal direction in the state in which the cover 30 covers the windows 22, that is, in the closed state. By holding the handles 40 which are present on both end portions, the user is capable of easily performing the opening and closing of the cover 30 and the attachment or removal of the cover 30 in relation to the housing 20. The shape of the handles 40 illustrated in FIG. 1 is merely an example, and the handle 40 may be any shape as long as the shape is easy to hold for a user. For example, the handles 40 may be shaped such that portions of the end portions protrude further to the outside, and may be articles which are separate components from the cover 30 and are attached to both of the end portions. Alternatively, the handles 40 may be formed by recessing portions of both of the end portions of the cover 30 into shapes which are easily gripped by fingers.

As described above, the housing-side wireless communication circuit 28 and the power transmission circuit 27 are positioned to be approximately diagonally opposite to each other in an area of the top surface 21, and the concept of being positioned diagonally opposite includes a case in which the housing-side wireless communication circuit 28 is in a position which is close to the rear side of the reading device 10, and the power transmission circuit 27 is in a position which is close to the front side of the reading device 10. However, as in the example of FIG. 1, it is more favorable for the power transmission circuit 27 to be present in a position closer to the shaft 29 than the housing-side wireless communication circuit 28, that is, on the rear side. This is because, in the process of the cover 30 being closed, the contactless power supply between the power transmission circuit 27 and the power reception circuit 37 is started at an earlier timing than when the wireless communication between the housing-side wireless communication circuit 28 and the cover-side wireless communication circuit 38 becomes possible.

The cover 30 may include legs 41 which protrude to the housing 20 side in the state in which the cover 30 covers the windows 22, that is, in the closed state.

Figure 4:
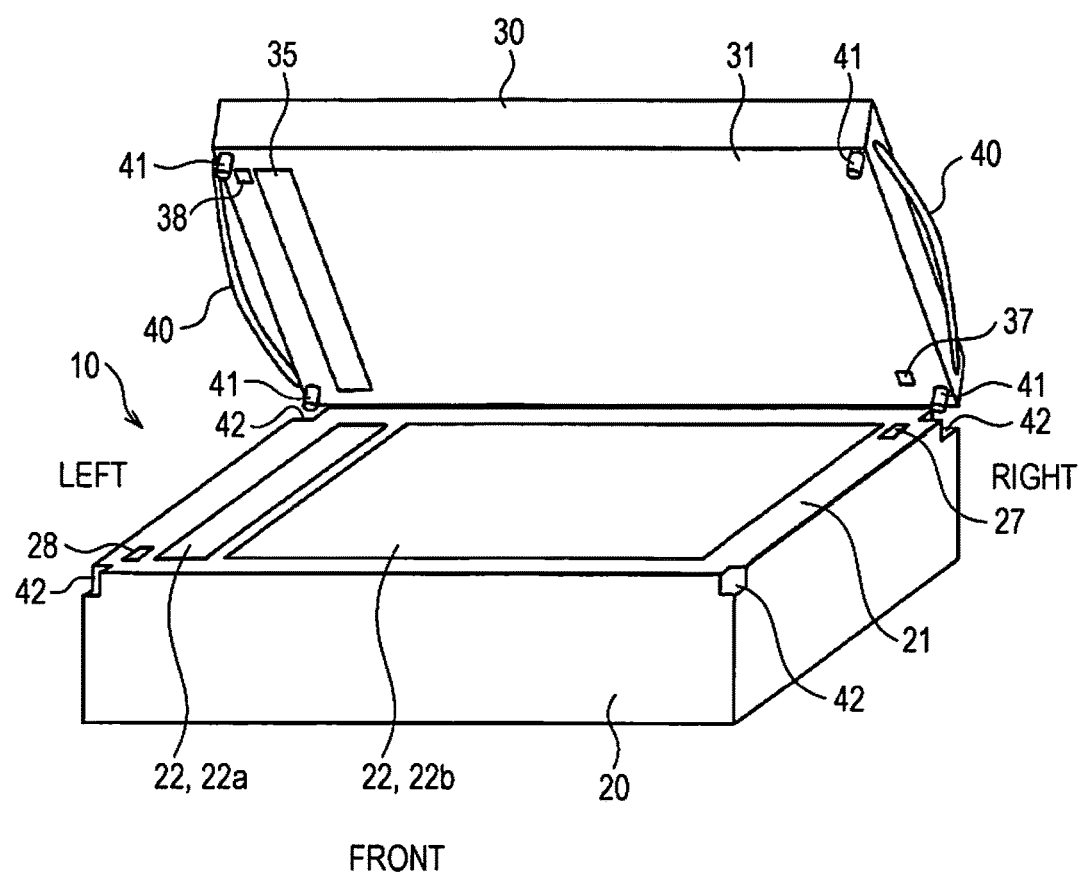
FIG. 4 is a perspective diagram illustrating an example of the external appearance of the reading device including legs on a cover.
Figure 5:
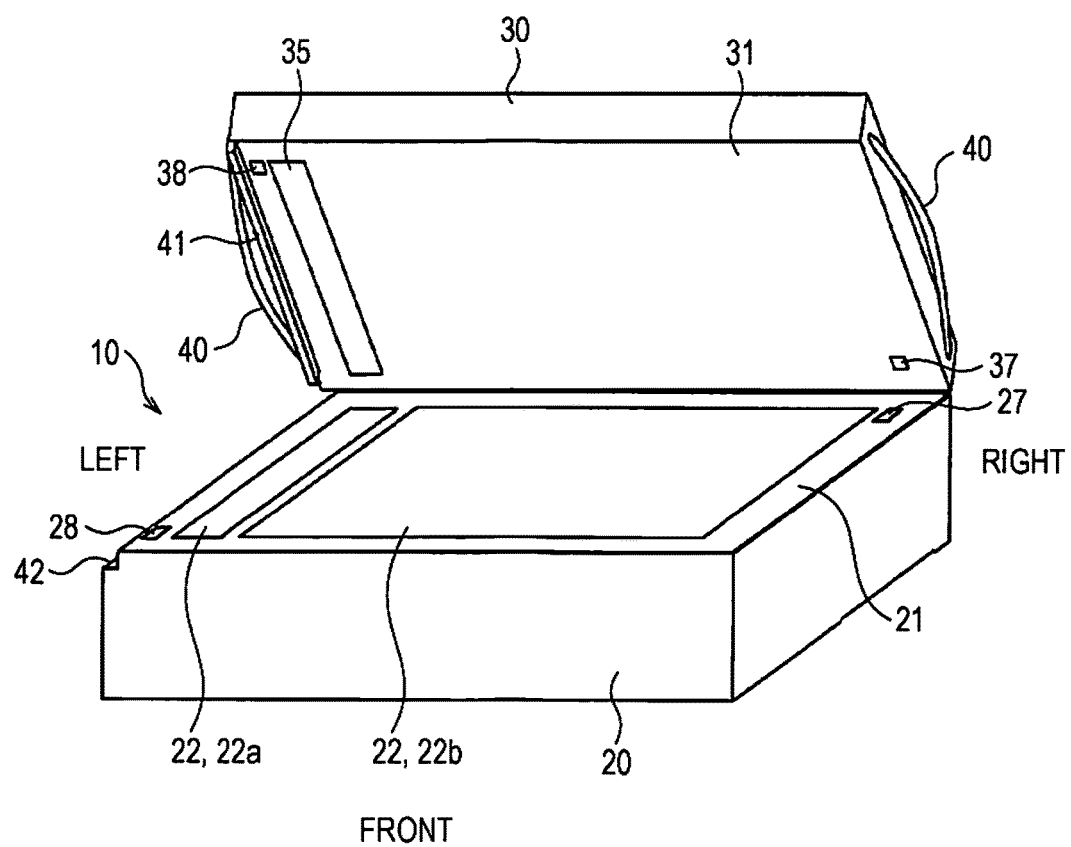
FIG. 5 is a perspective diagram illustrating another example of the external appearance of the reading device including a leg on the cover.

FIGS. 4 and 5 illustrate examples of the reading device 10 in cases in which the cover 30 including the legs 41 is provided from the same perspective as in FIG. 1.

In the example of FIG. 4, the cover 30 includes the leg 41 on each of the four corners of the bottom surface 31. The top surface 21 of the housing 20 which faces the cover 30 includes a recessed portion 42 for receiving the leg 41 on each of the four corners of the top surface 21. The number of the legs 41 is not limited to four, and may be more or less than four. In the example of FIG. 5, the cover 30 includes the single leg 41 on the side (the left side in the drawing) which is close to the first region 22*a* on the top surface 21 which faces the bottom surface 31. The leg 41 has a long shape parallel to the bottom surface 31. In the example of FIG. 5, the top surface 21 of the housing 20 includes the recessed portion 42 for receiving the leg 41 in the same manner as in FIG. 4. It is possible to adopt various shapes for the shape of the leg, such as a cylindrical shape, a prismatic shape, and a plate shape.

Due to the cover 30 including the leg 41 in this manner, it is possible to prevent the bottom surface 31 (in particular, the window 35 and the periphery thereof) of the cover 30 from touching the floor to become dirtied, damaged, or the like when the user removes the cover 30 from the housing 20 and places the cover 30 on the floor. Due to the leg 41 of the cover 30 and the recessed portion 42 of the housing 20 side for receiving the leg 41 being present, the leg 41 is stored in the recessed portion 42 when the cover 30 is closed, and the position of the cover 30 relative to the housing 20 is reliably stabilized every time. Accordingly, misalignment between the power transmission circuit 27 and the power reception circuit 37 and misalignment between the housing-side wireless communication circuit 28 and the cover-side wireless communication circuit 38 is prevented, and the contactless power supply and the wireless communication are executed stably when the cover 30 is in the closed state. However, the leg 41 may be formed on the outside of a position which fits within the area of the top surface 21 of the housing 20 when the cover 30 is closed.

A control unit 44 which is formed of an IC or the like is included on the cover 30 side. Specifically, of the behavior of the reading device 10 which is realized under the control of the control unit 24, the behavior of the cover 30 side is realized by the control of the control unit 44 which receives instructions from the control unit 24.

2. Explanation of Characteristics of Processes Executed by Reading Device

Figure 6:
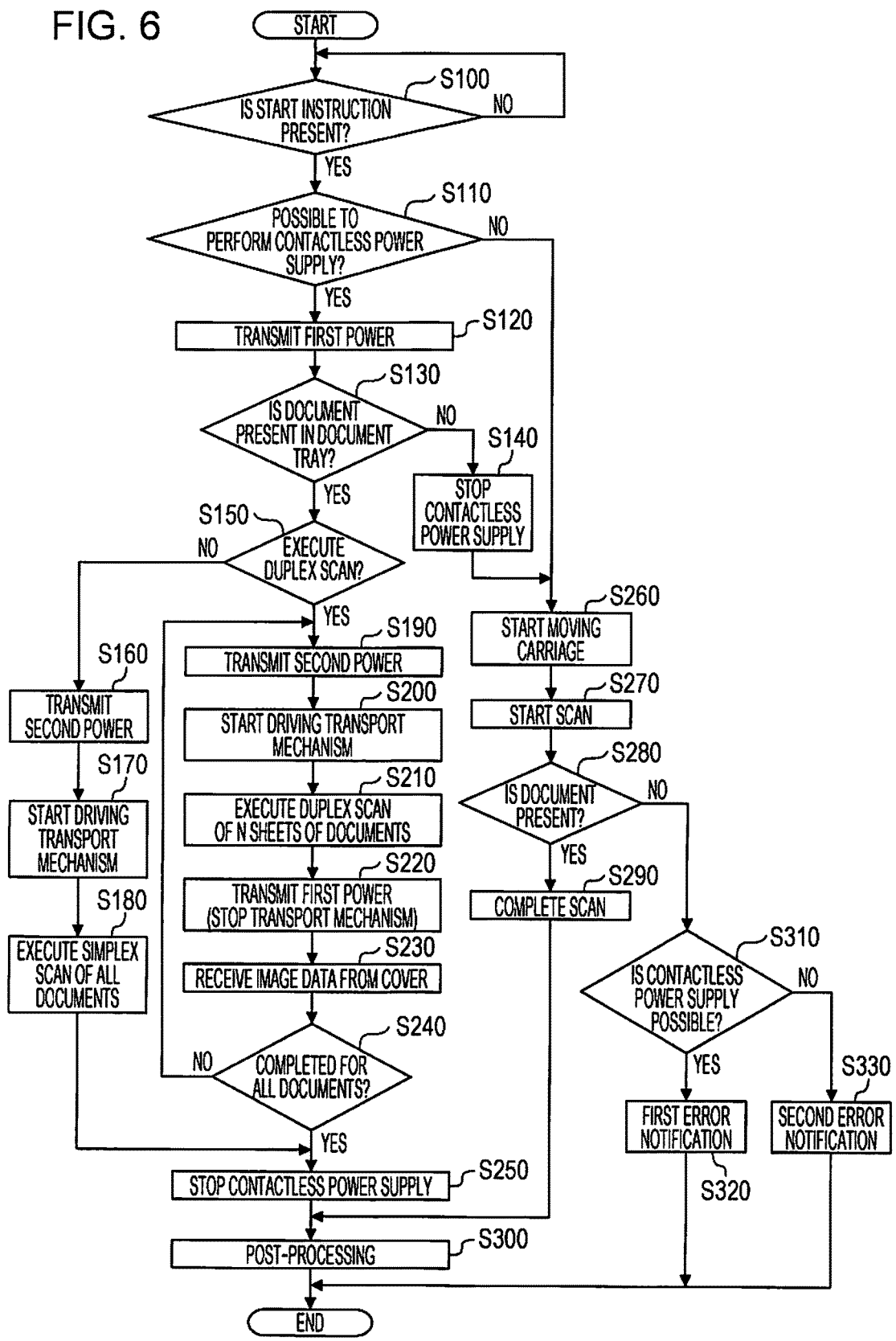
FIG. 6 is a flowchart illustrating an example of the processes executed by the reading device.

FIG. 6 illustrates an example of the processes realized by the control unit 24 according to a program using a flowchart. It should be noted that the steps configuring the flowchart described in the present embodiment are not all necessarily processes which are required for the concept of the invention.

In step S100, the control unit 24 constantly determines whether or not a start instruction is input from the user via the reception unit 25, and in a case in which the control unit 24 determines that the start instruction is input, the control unit 24 proceeds to step S110.

In step S110, the control unit 24 determines whether or not it is possible to supply power from the power transmission circuit 27 to the power reception circuit 37, that is, determines whether it is possible to perform contactless power supply, and in a case in which the control unit 24 determines that it is possible to perform contactless power supply, the control unit 24 proceeds to step S120, and in a case in which the control unit 24 determines that it is not possible to perform contactless power supply, the control unit 24 proceeds to step S260. The branch from step S110 to step S120 is generally a branch for executing the ADF scan mode, whereas the branch from step S110 to step S260 is generally a branch for executing the FB scan mode. Generally, a state in which it is possible to perform the contactless power supply is maintained as long as the cover 30 is closed in the correct position in relation to the housing 20, and conversely, a state in which contactless power supply is not possible is maintained as long as the cover 30 is in the open state, is closed in a position which is not correct in relation to the housing 20, or the like. In other words, since it is possible to infer that the state in which contactless power supply is not possible indicates that the use does not intend to select the ADF scan mode, the control unit 24 proceeds to the process for executing the FB scan mode (step S110→S260).

In step S110, for example, the control unit 24 determines that it is possible to perform contactless power supply in a case in which the power transmission efficiency between the power transmission circuit 27 and the power reception circuit 37 is greater than or equal to a predetermined threshold, and determines that it is not possible to perform contactless power supply in a case in which the power transmission efficiency is less than the threshold. Various specific methods of determination based on the power transmission efficiency may be considered. For example, the control unit 24 acquires notification of an amount of power generated on the power reception circuit 37 through communication (communication from the cover-side wireless communication circuit 38 to the housing-side wireless communication circuit 28) from the cover 30 side to the housing 20 side while causing the power transmission circuit 27 to transmit power. The cover-side wireless communication circuit 38 is caused to execute the communication by the control unit 44 of the cover 30 side. In a case in which the acquired amount of power is greater than or equal to the predetermined threshold, the control unit 24 determines that the power transmission efficiency is greater than or equal to the threshold, that is, that a state is attained in which it is possible to perform contactless power supply. Meanwhile, in a case in which the acquired amount of power is less than the predetermined threshold, a case in which the notification of the amount of power is not performed from the cover 30 side to start with, or the like, the control unit 24 determines that a state is attained in which the power transmission efficiency is less than the threshold, that is, it is not possible to perform contactless power supply.

In step S120, the control unit 24 controls the power transmission circuit 27 (for example, controls the current to allow to flow in the power transmission circuit 27 or the like), and causes a predetermined power to be transmitted. The power to be transmitted in step S120 will be referred to as a first power. Although the first power is a small power of an extent insufficient to drive the transport mechanism 33 (the motor of the transport mechanism 33), the first power is a sufficient power to drive the cover-side wireless communication circuit 38, the control unit 44, and a document sensor 43 (described later, refer to FIG. 1).

In step S130, the control unit 24 determines whether or not a document is placed on the document tray 32. The determination is performed according to detection results of the document sensor 43 which is provided in the vicinity of the document tray 32. The document sensor 43 is a sensor which detects the presence of a document in the document tray 32. The control unit 24 is notified of the detection results of the document sensor 43 through communication from the cover 30 side to the housing 20 side (communication from the cover-side wireless communication circuit 38 to the housing-side wireless communication circuit 28). In other words, the cover 30 (the control unit 44) causes the document sensor 43 to detect whether or not the document is present in the transport mechanism 33 in response to the power reception circuit 37 receiving power (the first power), and notifies the control unit 24 of the detection results. Accordingly, the control unit 24 is capable of determining whether or not the document is currently placed on the document tray 32. In a case in which the control unit 24 determines that the document is placed on the document tray 32, the control unit 24 proceeds to step S150, and in a case in which the control unit 24 determines that the document is not placed on the document tray 32, the control unit 24 proceeds to step S140.

In step S140, the control unit 24 controls the power transmission circuit 27 to stop the transmission of power, and on doing so, proceeds to step S260. In other words, since it is possible to infer that the document is not present on the document tray 32 indicates that the use does not intend to select the ADF scan mode, the control unit 24 stops the contactless power supply to the cover 30 side and proceeds to the process for executing the FB scan mode (step S130→S140→S260). Meanwhile, by proceeding to step S150, the reading of the document by the ADF scan mode is effectively started.

In step S150, the control unit 24 determines whether or not to execute the duplex scan, in a case in which the duplex scan is not to be executed (the simplex scan is to be executed), the control unit 24 proceeds to step S160, and in a case in which the duplex scan is to be executed, the control unit 24 proceeds to step S190. It is already set, via the reception unit 25, as to which of the duplex scan and the simplex scan to execute before the user inputs the start instruction. Therefore, the control unit 24 may perform the determination of step S150 according to the set content.

In step S160, the control unit 24 controls the power transmission circuit 27 to cause a predetermined power to be transmitted. The power to be transmitted in step S160 will be referred to as a second power. The second power is a greater power than the first power, and is a power of a sufficient extent for driving the transport mechanism 33 (the motor of the transport mechanism 33).

In step S170, the driving of the transport mechanism 33 is started. In other words, the control unit 44 controls the power reception circuit 37 to cause power to be supplied from the power reception circuit 37 to the transport mechanism 33 (the motor of the transport mechanism 33). Accordingly, the transporting of the document (the document which is placed on the document tray 32) by the transport mechanism 33 is started.

In step S180, the control unit 24 causes the reading of the one surface (the simplex scan) of the document by the first reading unit 23 to be executed in a state in which the carriage 26 is stopped in the position P1. The control unit 24 sequentially saves the image data for every document which is generated in the reading by the first reading unit 23 to a predetermined memory inside the housing 20. The reading is repeatedly executed for each document until the last document is transported by the transport mechanism 33. Once the reading of the last document is finished, the control unit 24 controls the power transmission circuit 27 to stop the transmission of power (stop contactless power supply, step S250).

In step S300, the control unit 24 executes the last process in relation to the reading result of the document which is obtained in step S180. Post-processing referred to here includes various processes. For example, as post-processes, the control unit 24 subjects the image data which is saved in the predetermined memory inside the housing 20 as the reading result of the document to specific processing, transfers the image data to an external device (for example, an external computer which is connected to the reading device 10 to be capable of communication), executing printing based on the image data, and the like. The control unit 24 ends the flowchart at a time at which the post-processing is completed.

Next, description will be given of a case in which the duplex scan is executed in the ADF scan mode (the processing when proceeding from step S150 to step S190). First, steps S190 and S200 are the same as steps S160 and S170.

In step S210, using a predetermined number of documents (N sheets) as targets, the control unit 24 causes the reading of the one surface of the document by the first reading unit 23, and the reading (duplex scanning) of the other surface of the document by the second reading unit 36 of the cover 30 side to be executed in a state in which the carriage 26 is stopped in the position P1. The control unit 24 sequentially saves the image data for every document (the one surface) which is generated in the reading by the first reading unit 23 to the predetermined memory inside the housing 20. Meanwhile, the control unit 44 sequentially saves the image data for every document (the other surface) which is generated in the reading by the second reading unit 36 to the predetermined memory inside the cover 30.

The N sheets corresponds to the number of pages of images which the predetermined memory inside the cover 30 is capable of storing. Since the predetermined memory inside the cover 30 is a memory for temporarily saving the reading result of the other surface before transmitting the image data, as the reading result of the other surface, to the housing 20 side, the storage capacity is significantly smaller than that of the predetermined memory inside the housing 20. Therefore, unlike in step S180 (the simplex scan) of continually transporting and reading generally all of the documents which are placed on the document tray 32, in step S210 (the duplex scan), the transporting and reading of the N sheets of documents is executed continually. The number N sheets depends on the specification of the product and is a comparatively small number of approximately 1 to 20 sheets, for example.

In step S220, the control unit 24 controls the power transmission circuit 27, and causes the power to be transmitted to drop from the second power to the first power. Accordingly, the driving of the transport mechanism 33 is stopped.

In step S230, the control unit 24 receives the image data for every one of the N sheets of documents (the other surfaces) which is generated in the reading by the second reading unit 36 from the cover 30 side and saves the image data to the predetermined memory inside the housing 20. In this case, in the cover 30 side, the control unit 44 reads the image data which is saved in the predetermined memory inside the cover 30, and transmits the image data from the cover-side wireless communication circuit 38 to the housing-side wireless communication circuit 28.

In step S240, the control unit 24 determines whether or not the reading of all of the documents is completed, and in a case in which the control unit 24 determines that the reading of all of the documents is completed, the control unit 24 executes steps S250 and S300 and ends the flowchart. It is possible to determine whether or not the reading of all of the documents is completed based on the detection results of whether or not the document is present by the document sensor 43 at this time. In step S240, in a case in which the control unit 24 determines that the reading of the documents is not all completed, the control unit 24 returns to step S190 and repeats the processes of step S190 onward. In other words, of the documents which are currently placed on the document tray 32, the N sheets of documents are newly transported and subjected to the duplex scan continually.

In step S260, the control unit 24 starts the movement of the carriage 26. Ordinarily, the carriage 26 returns to a predetermined home position when the moving is ended. Therefore, when the carriage 26 starts moving, the carriage 26 moves from a state of being stationary at the home position. The home position is the position P1 or in the vicinity of the position P1, for example.

In step S270, the control unit 24 starts the reading of the document using the FB scan mode. In other words, the control unit 24 causes the first reading unit 23 to read the document through the second region 22b while causing the carriage 26 to move (toward the position P2, for example). The control unit 24 determines whether or not the document is present on the document stand (the second region 22b) (step S280), and in a case in which the control unit 24 determines that the document is present, the control unit 24 continues the scan which is started in step S270. The control unit 24 determines that the document is present in a case in which the presence of the document is detected from the reading results of the first reading unit 23 which are obtained directly after starting the scan in step S270.

The control unit 24 completes the scan which is started in step S270 together with the end of the movement of the carriage 26 (for example, the carriage 26 reaching the position P2) (step S290). The control unit 24 saves the image data of the document which is generated in the reading by the first reading unit 23 to the predetermined memory inside the housing 20 during the execution of the FB scan mode in the same manner as during the execution of the ADF scan mode. The control unit 24 transitions from step S290 to step S300 and ends the flowchart.

In step S280 described above, in a case in which the control unit 24 determines that the document is not present on the document stand (the second region 22b), the control unit 24 returns the carriage 26 to the home position at this time, and branches the process according to whether it is possible to transmit power from the power transmission circuit 27 to the power reception circuit 37, that is, whether it is possible to perform contactless power supply (step S310). In step S310, the process is branched according to whether the process proceeded to step S260 onward as a result of the control unit 24 determining that contactless power supply is not possible in step S110, or whether the process transitioned from step S130 to step S140 to proceed to step S260 onward.

In a case in which the control unit 24 transitions from step S130 to step S140 and proceeds to step S260 onward, the control unit 24 proceeds from step S310 to step S320 and ends the flowchart after executing a first error notification. Meanwhile, in a case in which the control unit 24 proceeds to step S260 onward as a result of determining that it is not possible to perform contactless power supply in step S110, the control unit 24 proceeds from step S310 to step S330 and ends the flowchart after executing a second error notification. The control unit 24 executes the error notification to the user using output of images or sound via a display (not illustrated), a speaker (not illustrated), or the like which is provided on the surface of the housing 20, for example.

The content of the first error notification and the second error notification differs. In step S320, the control unit 24 performs notification indicating that the document is not placed on either the document tray 32 or the document stand (execute first error notification). Meanwhile, in step S330, the control unit 24 performs notification indicating that the document is not placed on the document stand, and indicates that it is necessary to correctly close the cover 30 in order to execute the ADF scan mode (executes the second error notification). In other words, in a case in which the control unit 24 proceeds to step S330, a situation is anticipated in which the cover 30 is not correctly closed even through the user intends to execute the ADF scan mode, and thus, the second error notification is executed. In this manner, it is possible to perform useful error notification to the user corresponding to the state of the reading device 10.

According to the present embodiment, a concept is disclosed indicating that the control unit 24 determines whether or not it is possible to perform contactless power supply in response to receiving the start instruction ("Yes" in step S100), and in a case in which the control unit 24 determines that it is possible to perform the contactless power supply ("Yes" in step S110), the control unit 24 executes the ADF scan mode (steps S150 to S250), and in a case in which the control unit 24 determines that contactless power supply is not possible ("No" in step S110), the control unit 24 executes the FB scan mode (steps S260 to S290). In other words, according to the state of the reading device 10, since either the ADF scan mode or the FB scan mode is automatically selected and executed, it is not necessary for the user to specify to the reading device 10 which of the modes to select.

According to the present embodiment, a concept is disclosed indicating that in a case in which, in response to receiving the start instruction ("Yes" in step S100), the control unit 24 determines that it is possible to perform contactless power supply ("Yes" in step S110), the control unit 24 causes the first power to be transmitted from the power transmission circuit 27 (step S120), the cover 30 detects whether the document is present in the transport mechanism 33 in response to the power reception circuit 37 receiving the power, notifies the control unit 24 of the detection results, in a case in which the detection results indicate that the document is present ("Yes" in step S130), the control unit 24 executes the ADF scan mode (steps S150 to S250), and in a case in which the detection results indicate that the document is not present ("No" in step S130), the control unit 24 stops the transmission of power from the power transmission circuit 27 (step S140) and executes the FB scan mode (steps S260 to S290). Accordingly, according to whether or not the document is present on the document tray 32, since either the ADF scan mode or the FB scan mode is automatically selected and executed, it is not necessary for the user to specify to the reading device 10 which of the modes to select.

According to the present embodiment, a concept is disclosed indicating that in a case in which, in response to the detection results indicating that the document is present ("Yes" in step S130), the control unit 24 executes the ADF scan mode, the control unit 24 causes the second power which is greater than the first power to be transmitted from the power transmission circuit 27 (steps S160 and S190), and the power reception circuit 37 supplies power to the transport mechanism 33 in response to receiving the second power. In other words, since only the first power which is small in comparison to the contactless power supply is supplied until the transport mechanism 33 is driven in the ADF scan mode, a certain degree of power saving effect arises.

According to the present embodiment, a concept is disclosed indicating that in a case in which the control unit 24 executes the duplex scan in the ADF scan mode ("Yes" in step S150), the control unit 24 causes the transport mechanism 33 to intermittently transport the documents (repeats the operations of transporting the N sheets of documents to be transported and subsequently stopping the transportation temporarily), and while reducing the amount of power which is transmitted from the power transmission circuit 27 between one transportation and the next (step S220), receives the image data which is generated in the reading by the second reading unit 36 from the cover 30 (step S230), whereas, in a case in which the control unit 24 executes the simplex scan ("No" in step S150), the control unit 24 continually causes the transport mechanism 33 to execute the transportation of the document until the completion of the reading of the documents on the document tray 32 (steps S170 and S180). In a case in which the duplex scan is executed, due to performing the transmission of the image data from the cover 30 to the housing 20 side when the power which is transmitted from the power transmission circuit 27 is reduced from the second power to the first power, it is possible to suppress the influence of the noise which is generated during the contactless power supply on the transmission of the image data as much as possible.

3. Other Embodiments

The invention is not limited to the embodiment described above, various embodiments are possible within a scope not departing from the gist of the invention, and, it is possible to adopt various embodiment such as those described later, for example. Configurations combining the embodiments, as appropriate, are included in the scope of the disclosure of the invention.

Figure 7:
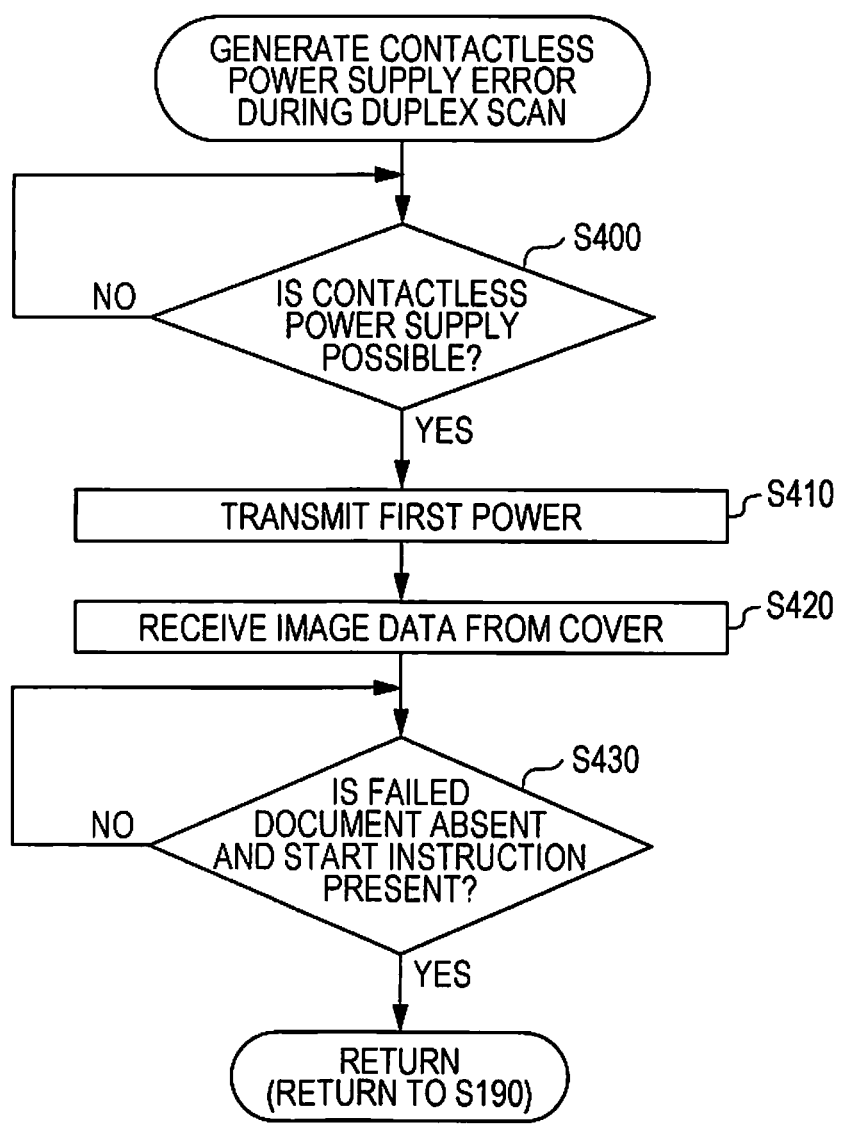
FIG. 7 is a flowchart illustrating the processes executed in a case in which a contactless power supply error occurs.

During the duplex scan in the ADF scan mode, it is considered that the cover 30 receives some sort of force, shifts, opens, or the like from the correct position in relation to the housing 20, and the contactless power supply is suddenly no longer possible. FIG. 7 is a flowchart illustrating the processes executed by the control unit 24 in a case in which the contactless power supply is suddenly no longer possible during the duplex scan (a case in which a contactless power supply error occurs). The control unit 24 constantly determines whether or not a state is assumed in which it is possible to perform the contactless power supply while repeating steps S190 to S240 in parallel, and when the control unit 24 determines that a state in which the contactless power supply is not possible is assumed, the control unit 24 starts the flowchart of FIG. 7.

In step S400, the control unit 24 determines whether or not it is possible to perform the contactless power supply, and in a case in which the control unit 24 determines that it is possible to perform the contactless power supply, the control unit 24 proceeds to step S410. In other words, after the contactless power supply error occurs during the duplex scan, the user realizes that the cover 30 is shifted, opened, or the like in relation to the housing 20, and in a case in which the user correctly closes the cover 30 again, the state in which it is possible to perform the contactless power supply is restored, and thus, it is possible to proceed from step S400 to step S410.

In step S410, the control unit 24 controls the power transmission circuit 27 to cause the first power to be transmitted. Next, in step S420, the control unit 24 receives the image data which is generated in the reading by the second reading unit 36 before the contactless power supply error is generated from the cover 30 side and saves the image data to the predetermined memory inside the housing 20.

Figure 8:
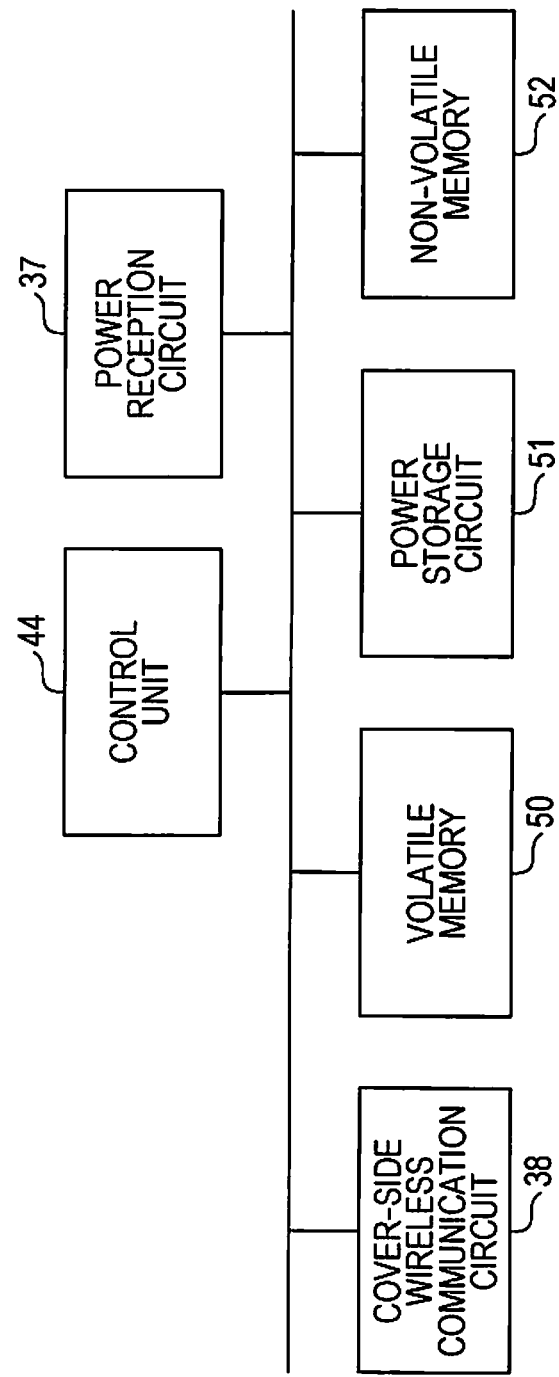
FIG. 8 is a block diagram exemplifying a portion of the configuration of the cover.

Description relating to step S420 will be performed with reference to FIG. 8. FIG. 8 exemplifies a portion of the configuration of the cover 30 using a block diagram. In addition to the configuration explained hereunto, the cover 30 includes a volatile memory 50, a power storage circuit 51, and a non-volatile memory 52. The volatile memory 50, the power storage circuit 51, and the non-volatile memory 52 may be considered as portions of the control unit 44. The volatile memory 50 corresponds to one of the predetermined memories inside the cover 30. The power storage circuit 51 includes a capacitor and the like, and stores at least a portion of the power which is received by the power reception circuit 37.

During the duplex scan, the image data which is generated by the second reading unit 36 reading the other surfaces of the N sheets of documents is temporarily saved to the volatile memory 50, and the control unit 44 reads the image data which is saved in the volatile memory 50 and transmits the image data from the cover-side wireless communication circuit 38 to the housing-side wireless communication circuit 28 (steps S210 to S230). However, in this situation, in a case in which the contactless power supply error occurs, the image data which is saved to the volatile memory 50 and is not yet transmitted to the housing 20 side is lost. Therefore, in a case in which an abnormality arises in the reception of power by the power reception circuit 37, that is, in a case in which the occurrence of the contactless power supply error is recognized, the control unit 44 transfers and stores the image data which is stored in the volatile memory 50 in the non-volatile memory 52 using the power which is stored in the power storage circuit 51. According to this process, it is possible to prevent the loss of the image data before transmission to the housing 20 side.

Therefore, in step S420, on the cover 30 side, the control unit 44 reads the image data which is saved in the non-volatile memory 52 and transmits the image data from the cover-side wireless communication circuit 38 to the housing-side wireless communication circuit 28. Accordingly, on the housing 20 side, the control unit 24 is capable of safely receiving the image data which is generated in the reading by the second reading unit 36 before the contactless power supply error occurs. Subsequently, in a case in which no failed documents are present and there is an input of the start instruction ("Yes" in step S430), the control unit 24 returns to step S190. A failed document refers to a document which stops part way down the transport path R. In other words, a duplex scan in which the control unit 24 checks that the failed document is removed from the transport path R using a predetermined sensor or the like (the user sets the removed failed document in the document tray 32 again), and when there is an input of the start instruction, the document which is currently set in the document tray 32 is used as a target.

Of the constituent elements exemplified in FIG. 8, the volatile memory 50 and the power storage circuit 51 may be omitted. In other words, a configuration may be adopted in which, during the duplex scan, the image data which is generated by the second reading unit 36 reading the other surfaces of the N sheets of documents is temporarily saved to the non-volatile memory 52, and the control unit 44 reads the image data which is saved in the non-volatile memory 52 and transmits the image data from the cover-side wireless communication circuit 38 to the housing-side wireless communication circuit 28 (steps S210 to S230). In such a configuration, even if the contactless power supply error occurs, the image data which is saved to the non-volatile memory 52 and is not yet transmitted to the housing 20 will not be lost.

Figure 9:
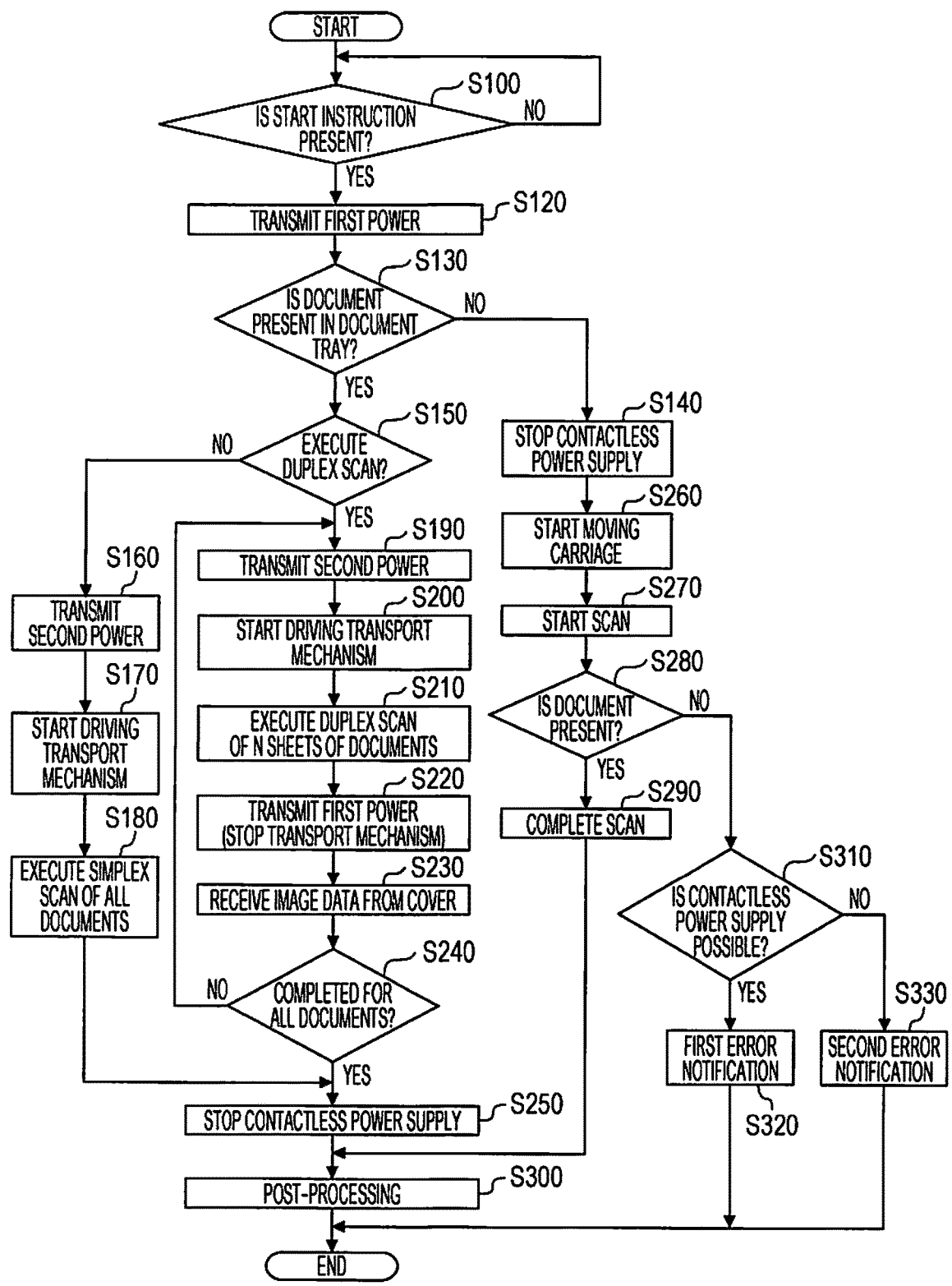
FIG. 9 is a flowchart illustrating another example of the processes executed by the reading device.

FIG. 9 illustrates an example of the processes realized mainly by the control unit 24 according to a program, which is a different example from FIG. 6, using a flowchart. In FIG. 9, the determination of step S110 (FIG. 6) is omitted when compared to FIG. 6. In other words, the control unit 24 may simply branch the execution of the ADF scan mode and the execution of the FB scan mode according to the determination of whether or not the document is placed on the document tray 32.

According to FIG. 9 and the description hereunto, a configuration may be considered in which the reading device is provided with the housing which includes a window, the reading unit for reading which is positioned in the inner portion of the housing, the cover which covers the window and includes a transport mechanism which transports a document to a position facing a first region of the window, and a control unit which controls a first reading mode which causes the reading unit to read the document which is transported by the transport mechanism through the first region, and a second reading mode which causes the reading unit to read the document which is not transported by the transport mechanism through the second region of the window. In the reading device, the housing includes a power transmission circuit which transmits power wirelessly, the cover includes a power reception circuit which receives power wirelessly at a position facing the power transmission circuit in a state in which the window is covered, the control unit causes a first power to be transmitted from the power transmission circuit in response to receiving an instruction to start the reading, the cover detects the presence of the document in the transport mechanism in response to the power reception circuit receiving power and notifies the control unit of the detection results, the control unit executes the first reading mode in a case in which the detection results indicate that the document is present, and, in a case in which the detection results indicate that the document is not present, causes the transmission of power from the power transmission circuit to stop and executes the second reading mode, and in a case in which the control unit executes the first reading mode, the control circuit causes a second power which is greater than the first power to be transmitted from the power transmission circuit, and the power reception circuit supplies power to the transport mechanism in response to receiving power.

Figure 10:
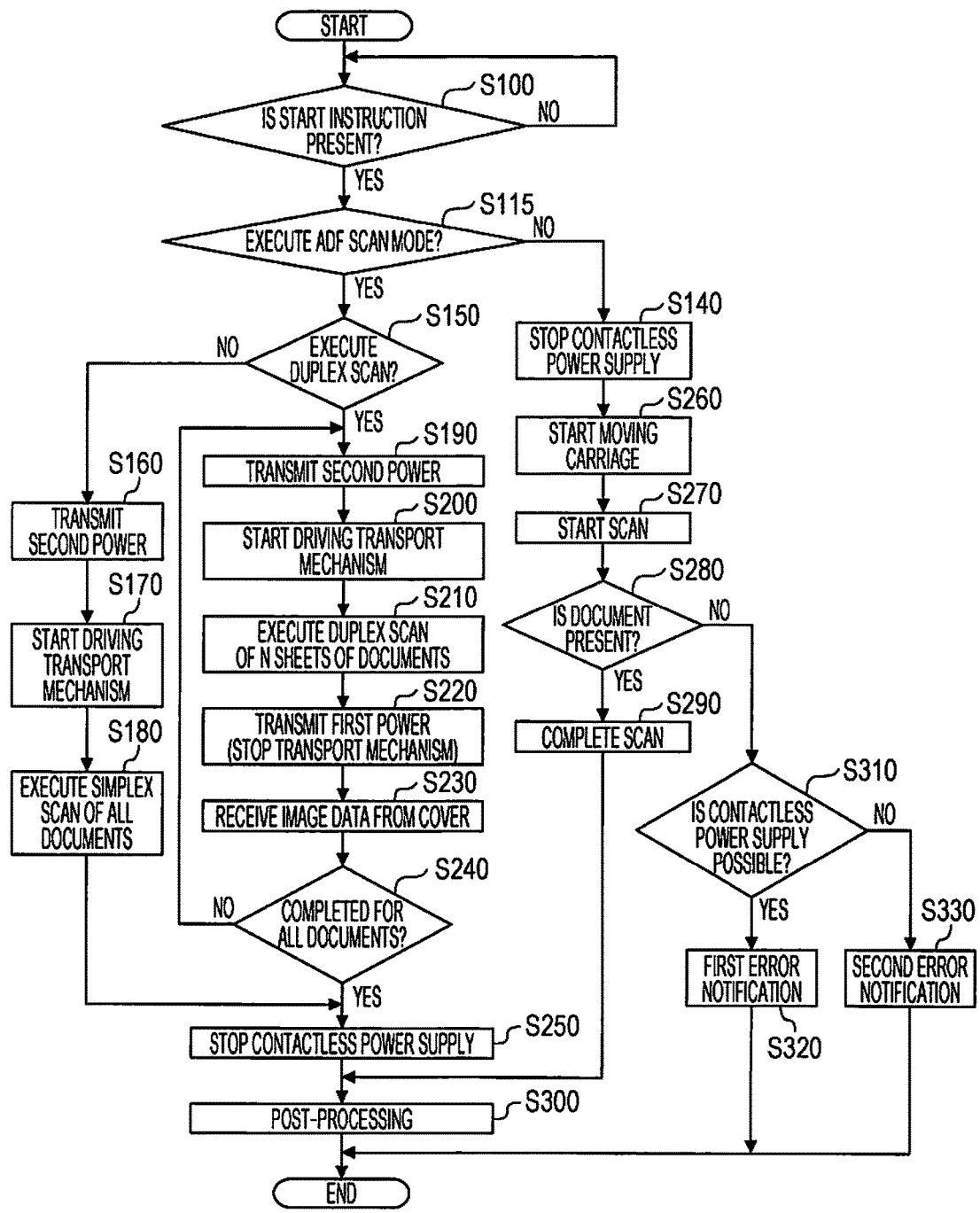
FIG. 10 is a flowchart illustrating still another example of the processes executed by the reading device.

FIG. 10 illustrates an example of the processes realized mainly by the control unit 24 according to a program, which is a different example from FIGS. 6 and 9, using a flowchart. When compared with FIGS. 6 and 9, steps S110 (FIG. 6), S120 (FIGS. 6 and 9), and S130 (FIGS. 6 and 9) are omitted from FIG. 10, and instead, FIG. 10 includes step S115. In step S115, the control unit 24 determines whether or not to execute the ADF scan mode, in a case in which the ADF scan mode is to be executed, the control unit 24 proceeds to step S150, and in a case in which the ADF scan mode is not to be executed (the FB scan mode is to be executed), the control unit 24 proceeds to step S140. In FIG. 10, at the timing of step S140, as long as the contactless power supply is not executed to begin with, it is not necessary to execute step S140.

It is of no particular concern as to which determination method is adopted in step S115. The control unit 24 may allow the user to specify which of the ADF scan mode and the FB scan mode is to be executed via the reception unit 25, and may reuse the determination methods described hereunto in step S110 and step S130.

According to FIG. 10 and the description hereunto, a configuration may be considered in which the reading device is provided with the housing which includes a window, a first reading unit for reading which is positioned in the inner portion of the housing, the cover which covers the window and includes a transport mechanism which transports a document to a position facing a first region of the window, and a control unit which controls a first reading mode which causes the first reading unit to read the document which is transported by the transport mechanism through the first region, and a second reading mode which causes the first reading unit to read the document which is not transported by the transport mechanism through the second region of the window. In the reading device, the housing includes a power transmission circuit which transmits power wirelessly, the cover includes a power reception circuit which receives power wirelessly at a position facing the power transmission circuit in a state in which the window is covered, and a second reading unit for reading, in the first reading mode, in a case in which the control unit executes the duplex scan in which the control unit causes the first reading unit to read the one surface of the document and causes the second reading unit to read the other surface of the document, the control unit causes the transport mechanism to intermittently transport the document, and receives image data which is generated in the reading by the second reading unit while reducing the amount of power transmitted from the power transmission circuit between one transportation and the next from the cover, and in the first reading mode, in a case in which the control unit executes the simplex scan in which the first reading unit is caused to read the one surface of the document, the control unit causes the transport mechanism to continually execute the transportation of the document until the completion of the reading of the document.

Hereunto, a configuration is adopted in which, in a case in which the control unit 24 determines whether or not it is possible to perform the contactless power supply, the control unit 24 determines whether or not the power transmission efficiency between the power transmission circuit 27 and the power reception circuit 37 is greater than or equal to a predetermined threshold; however, it is possible to use a different determination method. For example, in a case in which the reading device 10 includes an open-close sensor which detects the opening and closing of the cover 30 and the open-close sensor detects the closed state of the cover 30, the control unit 24 may determine that it is possible to perform the contactless power supply. The reading device 10 may be provided with a foreign matter sensor which detects foreign matter in a case in which foreign matter is present between the top surface 21 of the housing 20 and the bottom surface 31 of the cover 30, and in a case in which the foreign matter sensor detects the foreign matter, the control unit 24 may at least determine that it is not possible to perform the contactless power supply.

In FIGS. 6, 9, and 10, the control unit 24 may query the user using images or audio as to whether or not to further execute a scan after executing the post-processing (step S300). In a case in which there is an affirmative response to the query (for example, a start instruction), the control unit 24 may execute the flowcharts illustrated in FIGS. 6, 9, and 10 again.

Even if the cover 30 is configured not to include the second reading unit 36, it is possible to perform the duplex scan in the ADF scan mode. In other words, the transport mechanism 33 transports the document which is placed on the document tray 32 along the transport path R, and subsequently transports the document along the transport path R again in an inverted state. Accordingly, it is possible to read the obverse and reverse of the same document through the first region 22a using the first reading unit 23 of the housing 20 side. However, in a duplex scan which is realized by the transport mechanism 33 inverting the documents one sheet at a time, the explanation of steps S190 to S240 given hereunto does not apply.

The first reading unit 23 inside the housing 20 may not be installed in the carriage 26. For example, the first reading unit 23 may be an area sensor capable of reading a certain area at once, and may be a device capable of reading the document through the window 22 without moving.

Description is given of an example which is applied to the cover 30, which includes the transport mechanism 33, as the second housing; however, the second housing may be a cover which includes a light source for reading a transparent document and does not include the transport mechanism 33. In this case, wireless supply of power is performed in a case of, instead of the ADF scan mode, a transparent document mode which reads a transparent document, and the light source is lit using the power. The second housing includes the transport mechanism which transports the document to the reading unit; however, the second housing may be a transport unit which is not a cover.

What is claimed is:

1. A reading device, comprising:
    a main body including a window; and
    a cover removably mounted to the main body, the cover being configured to cover an entire of the window in a state of being mounted to the main body,
    the main body further including
        a reading unit which reads a document according to a reading mode, and
        a power transmission circuit which wirelessly supplies power to the cover according to the reading mode, and
    the cover including
        a power reception circuit which wirelessly receives power from the power transmission circuit,
    the main body and the cover being rotatable around a shaft which is interposed between the main body and the cover and is received by a bearing, and
    the main body and the cover being attachable and detachable relative to each other by attaching and detaching the shaft to the bearing.

2. The reading device according to claim 1,
    wherein the cover includes a transport mechanism which transports a document to a position facing a first region of the window using power from the power reception circuit in a state of being mounted on the main body,
    wherein the reading device is provided with reading modes including a first reading mode which causes the reading unit to read the document which is transported by the transport mechanism through the first region, and a second reading mode which causes the reading unit to read the document which is not transported by the transport mechanism through the second region of the window,
    wherein in the first reading mode, the reading unit performs reading using the first region and the power transmission circuit performs power transmission, and wherein in the second reading mode, the reading unit performs reading using the second region and the power transmission circuit does not perform power transmission.

3. The reading device according to claim 2,
wherein the main body includes the power transmission circuit in a position outside of the window of the second region of an opposite side from a side of the first region, and
wherein the cover includes the power reception circuit in a position facing the power transmission circuit in a state in which the cover is mounted to the main body.

4. The reading device according to claim 2,
wherein a carriage on which the reading unit is installed and which is configured to move along a predetermined direction under control of the control unit is included on an inner portion of the main body, and
wherein the cover includes handles on both end portions positioned on a one end side and another end side in the predetermined direction in a state in which the window is covered.

5. The reading device according to claim 3,
wherein the main body includes a first wireless communication circuit which executes wireless communication in a position outside of the window of the second region on the side of the first region, and
wherein the cover includes a second wireless communication circuit which executes wireless communication in a position facing the first wireless communication circuit in a state in which the window is covered.

6. The reading device according to claim 5,
wherein the power transmission circuit is positioned on a side of a corner of the second region in a diagonally opposing relationship with a corner of the second region in a vicinity of a position of the first wireless communication circuit.

7. The reading device according to claim 5,
wherein the power transmission circuit is in a position closer to the shaft than the first wireless communication circuit.

8. The reading device according to claim 1,
wherein the window has a first region and a second region, the first region and the second region are aligned in an aligning direction,
the reading unit reads a document via the window according to a reading mode,
the cover includes a transport mechanism which transports the document to a position facing the first region of the window using power from the power reception circuit in a state of being mounted on the main body,
the power transmission circuit is arranged outside of the window and arranged such that the second region is positioned between the first region and the power transmission circuit in the aligning direction, and
the power reception circuit in a position faces the power transmission circuit while the main body is covered by the cover.

9. The reading device according to claim 1,
wherein the main body further includes a first reading unit which reads a document according to a reading mode, and a first memory which stores image data of the document that the first reading unit reads, and
the cover further includes a second reading unit which reads the document according to the reading mode, and a second memory which stores image data of the document that the second reading unit reads, the second memory having a storage capacity that is smaller a storage capacity of the first memory.

10. A reading device, comprising:
a main body including a window; and
a cover removably mounted to the main body, the cover being configured to cover an entire of the window in a state of being mounted to the main body,
the main body further including
a first reading unit which reads a document according to a reading mode, and
a power transmission circuit which wirelessly supplies power to the cover according to the reading mode, and
the cover including
power reception circuit which wirelessly receives power from the power transmission circuit, and
a leg which protrudes to the main body side in a state in which the window is covered, the leg supporting a part of the cover such that the part of the cover is spaced apart from a floor when the cover is removed from the main body and is disposed on the floor.

11. The reading device according to claim 10,
wherein the cover includes a second reading unit which reads the document, and the second reading unit is located corresponding to the part of the cover.

12. The reading device according to claim 10,
wherein the cover includes a transport mechanism which transports a document to a position facing a first region of the window using power from the power reception circuit in a state of being mounted on the main body,
wherein the reading device is provided with reading modes including a first reading mode which causes the reading unit to read the document which is transported by the transport mechanism through the first region, and a second reading mode which causes the reading unit to read the document which is not transported by the transport mechanism through the second region of the window,
wherein in the first reading mode, the reading unit performs reading using the first region and the power transmission circuit performs power transmission, and
wherein in the second reading mode, the reading unit performs reading using the second region and the power transmission circuit does not perform power transmission.

13. The reading device according to claim 12,
wherein the main body includes the power transmission circuit in a position outside of the window of the second region of an opposite side from a side of the first region, and
wherein the cover includes the power reception circuit in a position facing the power transmission circuit in a state in which the cover is mounted to the main body.

14. The reading device according to claim 13,
wherein the main body includes a first wireless communication circuit which executes wireless communication in a position outside of the window of the second region on the side of the first region, and
wherein the cover includes a second wireless communication circuit which executes wireless communication in a position facing the first wireless communication circuit in a state in which the window is covered.

15. The reading device according to claim 14,
wherein the power transmission circuit is positioned on a side of a corner of the second region in a diagonally opposing relationship with a corner of the second region in a vicinity of a position of the first wireless communication circuit.

16. The reading device according to claim 14,
wherein the main body and the cover are configured to rotate c around a shaft which is interposed between the main body and the cover, and
wherein the power transmission circuit is in a position closer to the shaft than the first wireless communication circuit.

17. The reading device according to claim 12,
wherein a carriage on which the reading unit is installed and which is configured to move along a predetermined direction under control of the control unit is included on an inner portion of the main body, and
wherein the cover includes handles on both end portions positioned on a one end side and another end side in the predetermined direction in a state in which the window is covered.

18. The reading device according to claim 10,
wherein the window has a first region and a second region, the first region and the second region are aligned in an aligning direction,
the reading unit reads a document via the window according to a reading mode,
the cover includes a transport mechanism which transports the document to a position facing the first region of the window using power from the power reception circuit in a state of being mounted on the main body,
the power transmission circuit is arranged outside of the window and arranged such that the second region is positioned between the first region and the power transmission circuit in the aligning direction, and
the power reception circuit in a position faces the power transmission circuit while the main body is covered by the cover.

19. The reading device according to claim 10,
wherein the main body further includes a first reading unit which reads a document according to a reading mode, and a first memory which stores image data of the document that the first reading unit reads, and
the cover further includes a second reading unit which reads the document according to the reading mode, and a second memory which stores image data of the document that the second reading unit reads, the second memory having a storage capacity that is smaller a storage capacity of the first memory.

* * * * *